(12) United States Patent
Wong et al.

(10) Patent No.: US 9,057,593 B1
(45) Date of Patent: Jun. 16, 2015

(54) DUAL-FUNCTION GAGE FOR MEASURING DIMENSIONS OF A FASTENER ASSEMBLY

(71) Applicant: The Boeing Company, Chicago, IL (US)

(72) Inventors: Kin Yip Wong, Renton, WA (US); George W. Wong, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 14/037,418

(22) Filed: Sep. 26, 2013

(51) Int. Cl.
*G01B 5/02* (2006.01)

(52) U.S. Cl.
CPC ........................................ *G01B 5/02* (2013.01)

(58) Field of Classification Search
CPC ............ G01B 5/02; G01B 5/061; G01B 5/14; G01B 5/18
USPC .................... 33/791, 792, 806, 832, 833, 836
See application file for complete search history.

(56) References Cited

U.S. PATENT DOCUMENTS

| | | | |
|---|---|---|---|
| 2,921,375 A * | 1/1960 | Kustusch | ........................ 33/836 |
| 4,577,412 A * | 3/1986 | McKinney | ..................... 33/833 |
| 4,806,054 A | 2/1989 | Rath | |
| 4,943,196 A | 7/1990 | Dahl | |
| 4,983,085 A | 1/1991 | Gray | |
| 6,011,482 A | 1/2000 | Banks et al. | |
| 6,971,182 B1 * | 12/2005 | Guffey et al. | ................... 33/833 |
| 7,200,256 B2 | 4/2007 | Rose et al. | |
| 2008/0127503 A1 * | 6/2008 | St. Louis et al. | ............... 33/833 |
| 2008/0307664 A1 * | 12/2008 | Wong et al. | ..................... 33/534 |
| 2012/0304477 A1 * | 12/2012 | Zhang | ............................. 33/836 |
| 2013/0298414 A1 * | 11/2013 | Zhang | ............................. 33/502 |
| 2015/0088454 A1 * | 3/2015 | Sugiyama et al. | ............ 702/155 |

* cited by examiner

*Primary Examiner* — G. Bradley Bennett
(74) *Attorney, Agent, or Firm* — Ostrager Chong Flaherty & Broitman P.C.

(57) ABSTRACT

An apparatus capable of measuring pin protrusion and collar swage height in a fastener assembly. The apparatus comprises: a gage body; a shaft that is translatable along its axis; an instrument that measures the absolute axial position of the shaft relative to a zero position; pin protrusion and collar swage height measurement contact members coupled to the shaft; and a slotted gage plug that is rotatable and axially displaceable relative to the gage body. The gage plug sits on the swaged collar during measurements. When the collar swage height measurement contact member is disposed in the slot in the gage plug, pin protrusion can be measured. When the collar swage height measurement contact member is not disposed in the slot and instead rests on top of the gage plug, the collar swage height can be measured.

20 Claims, 12 Drawing Sheets

DUAL-FUNCTION GAGE FOR MEASURING DIMENSIONS OF A FASTENER ASSEMBLY

BACKGROUND

This disclosure generally relates to systems and methods for measuring fastener assembly dimensions of interest. In particular, this disclosure relates to measuring the pin protrusion height (hereinafter "pin protrusion") and collar swage height of bolt-swaged collar fastener assemblies.

It is known to measure the pin protrusion and collar swage height of a bolt-swaged collar fastener assembly using different gages. It is time consuming to use separate gages to perform the respective measurements. Typically, the inspector/mechanic uses a pin protrusion gage first and then removes the pin protrusion gage from the fastener assembly and retrieves a collar swage height gage. In certain assemblies where such measurements are performed, many of these fastener assemblies are used in close proximity to one another. Therefore when changing gages, the inspector/mechanic tries to remember which installed fastener assembly has just been measured for pin protrusion and then uses the collar swage height gage on the same fastener assembly. The collar swage height is dependent on the pin protrusion dimension in that tables are provided in which the range of acceptable collar swage height values is dependent on the pin protrusion value. Accordingly, measurement of pin protrusion for one fastener assembly followed by measurement of collar swage height for a mistakenly selected (i.e., different) fastener assembly could lead to false interpretation of the results.

It would be advantageous to provide a single gage capable of measuring both pin protrusion and collar swage height, thereby avoiding alternating usage of separate gages and the difficulties that attend such alternation of gages.

SUMMARY

The subject matter disclosed herein is directed to a gage capable of measuring pin protrusion and collar swage height in sequence without removing the gage from the fastener assembly under inspection. The gage comprises: a gage body; a shaft that is translatable along its axis; an instrument that measures the absolute axial position of the shaft relative to a zero position; pin protrusion and collar swage height measurement contact members coupled to the shaft; and a slotted gage plug that is rotatable and axially displaceable relative to the gage body. The gage plug sits on the swaged collar during measurements. When the collar swage height measurement contact member is disposed in the slot in the gage plug, pin protrusion can be measured. When the collar swage height measurement contact member is not disposed in the slot and instead rests on top of the gage plug, the collar swage height can be measured.

The above-described dual-function gage is capable of measuring both pin protrusion height and collar swage height of installed fastener assemblies. This gage uses a digital indicator with a two-pronged shaft tip attachment to attain the dual functions and a specially designed gage plug to allow the shifting between a first measurement mode for measuring pin protrusion and a second measurement mode for measuring the collar swage height. The shifting between modes is done manually by the inspector/mechanic and can be accomplished without completely disengaging the gage from the fastener assembly being measured. This dual-function gage saves inspection time and avoids changing gages, thereby preventing an inspector/mechanic from measuring the pin protrusion of one fastener assembly with a pin protrusion measurement gage and then mistakenly measuring the collar swage height of a different fastener assembly using a collar swage height measurement gage.

A respective dual-function gage can be provided for each different fastener size that needs to be inspected. A set of dual-function gage can be provided having respective pin protrusion measurement tips of different diameters integrated therein. Thus no interchanging of tips in a single gage is required. Instead the gages can be interchanged when the size of the fastener assemblies to be measured changes.

One aspect of the subject matter disclosed herein is an apparatus comprising: a gage body; a shaft which is axially displaceable relative to the gage body; a digital indicator coupled to the gage body and configured to measure axial displacement of the shaft relative to the gage body; a first contact member coupled to the shaft, the first contact member having a first contact surface; a second contact member coupled to the shaft, the second contact member having a second contact surface offset from the first contact surface; and a gage plug insertable into an interior space bounded at least in part by the gage body and having a slot, the gage plug being rotatable and axially displaceable relative to the gage body and the slot being parallel to the shaft when the gage plug is inserted into the interior space. When the gage plug is in a first angular position relative to the gage body, the second contact member is aligned with the slot, and when the gage plug is in a second angular position different than the first angular position, the second contact member is not aligned with the slot. In one implementation, the gage body comprises a slot, while the gage plug comprises a pin that fits in the slot of the gage body, and the apparatus further comprises a retainer device disposed outside the gage body and rotatable relative thereto. The retainer device blocks the pin from exiting the slot at a lower end thereof when the retainer device is in a first angular position relative to the gage body and does not block the pin from exiting the slot at the lower end thereof when the retainer device is in a second angular position relative to the gage body. The digital indicator may comprise an encoder for outputting incremental displacement signals in response to incremental displacement of the shaft relative to the gage body, and a processor for converting incremental displacement signals into signals representing total displacement of the shaft. Optionally, the apparatus further comprises a display unit which displays symbology representing the total displacement in response to receipt from the processor of signals representing total displacement of the shaft.

Another aspect of the disclosed subject matter is a system that may comprise first and second parts fastened together by at least one fastener assembly comprising a bolt and a swaged collar, and a measuring apparatus. The measuring apparatus comprises: a gage body seated on a portion of the first part located radially outward of the collar; a shaft disposed above the bolt and axially displaceable relative to the gage body; a first contact member coupled to the shaft and having a first contact surface; a second contact member coupled to the shaft and having a second contact surface offset from the first contact surface; and a gage plug seated on the collar, the gage plug being rotatable and axially displaceable relative to the gage body and having a center hole. The shaft is in a first axial position and the first contact surface contacts the bolt when the measuring apparatus is in a pin protrusion measurement mode; the shaft is in a second axial position and the second contact surface contacts the gage plug when the measuring apparatus is in a collar swage height measurement mode. The measuring apparatus further comprises a digital indicator coupled to the gage body and configured to measure axial displacement of the shaft relative to the gage body. The gage plug may comprise a slot disposed parallel to the shaft, in which case the slot is aligned with the second contact member when the measuring apparatus is in the pin protrusion measurement mode and not aligned with the second contact member when the measuring apparatus is in the collar swage height measurement mode.

A further aspect of the disclosed subject matter is a kit comprising: a gage body that at least partly bounds an interior space; a shaft which is axially displaceable relative to the gage body; a digital indicator coupled to the gage body and configured to measure axial displacement of the shaft relative to the gage body; a first gage plug having a first height and a first slot, the first gage plug being insertable into the interior space, wherein when the first gage plug is inserted into the interior space, the gage plug is rotatable and axially displaceable relative to the gage body and the first slot is parallel to the shaft; a first contact member having a first contact surface, the first contact member being configured for attachment to the shaft; and a second contact member having a second contact surface, the second contact member being configured for attachment to the shaft. When the first and second contact members are attached to the shaft and the first gage plug is inserted in the interior space, the first slot will be aligned with said second contact member when the gage plug is in a first angular position relative to the gage body, and the first slot will not be aligned with the second contact member when the first gage plug is in a second angular position relative to the gage body. The kit may further comprise a second gage plug having a second height and a second slot, the second gage plug being insertable into the interior space instead of the first gage plug. When the second gage plug is inserted into the interior space, the second gage plug is rotatable and axially displaceable relative to the gage body and the second slot is parallel to the shaft. The gage body comprises a slot, and each of the first and second gage plugs comprises a pin that fits in the slot of the gage body. A retainer device can be rotatably coupled to the gage body, which retainer device blocks the pin from exiting the slot of the gage body at a lower end thereof when the retainer device is in a first angular position relative to the gage body and does not block the pin from exiting the slot of the gage body at the lower end thereof when the retainer device is in a second angular position relative to the gage body.

Yet another aspect of the disclosed subject matter is a method of measuring pin protrusion and collar swage height in an assembly comprising first and second parts having aligned holes, a bolt that passes through the aligned holes and protrudes above a surface of the first part, and a swaged collar disposed on the protruding portion of the bolt. The measuring method comprising the following steps: (a) placing a collar swage height measurement contact member carried by an axially displaceable shaft in contact with a top surface of a slotted gage plug disposed in a first angular position relative to a gage body of a gage; (b) placing bottom surfaces of the gage body and the slotted gage plug on a planar surface of a plate while the collar swage height measurement contact member is in contact with the top surface of the slotted gage plug; (c) zeroing the position of the shaft while the collar swage height measurement contact member, the gage body and the slotted gage plug are in the positions recited in step (b); (d) rotating the slotted gage plug from the first angular position to a second angular position whereat the slot of the slotted gage plug is aligned with the collar swage height measurement contact member; (e) placing the collar swage height measurement contact member into the slot of the slotted gage plug; (f) while the collar swage height measurement contact member is in the slot of the slotted gage plug, placing the gage body over the fastener assembly in a position such that the bottom surface of the gage body is seated on the first part, the bottom surface of the slotted gage plug is seated on the swaged collar and a pin protrusion measurement contact member carried by the shaft is in contact with the bolt; (g) while the slotted gage plug is fully seated on the swaged collar and the pin protrusion measurement contact member is in contact with the bolt, recording a first value representing a first total axial displacement of the shaft relative to its zeroed position; (h) moving the collar swage height measurement contact member out of the slot of the slotted gage plug; (i) while the collar swage height measurement contact member is out of the slot of the slotted gage plug, rotating the slotted gage plug to a third angular position whereat the slot of the slotted gage plug is not aligned with the collar swage height measurement contact member and the collar swage height measurement contact member is in contact with the top surface of the slotted gage plug; and (j) while the slotted gage plug is fully seated on the swaged collar and the collar swage height measurement contact member is in contact with the top surface of the slotted gage plug, recording a second value representing a second total axial displacement of the shaft relative to its zeroed position. Preferably steps (h) through (j) are performed while the bottom surface of the gage body is in contact with the first part.

The measuring method further comprises the following steps performed by a data processor: calculating a pin protrusion value by summing the first value and a value representing of a height of the slotted gage plug; determining a range of acceptable collar swage height values corresponding to the pin protrusion value; comparing the second value to the range of acceptable collar swage height values; and issuing an alert if the second value lies outside the range of acceptable collar swage height values.

Other aspects are disclosed in detail and claimed below.

BRIEF DESCRIPTION OF THE DRAWINGS

Reference will hereinafter be made to the drawings in which similar elements in different drawings bear the same reference numerals.

DETAILED DESCRIPTION

For the purpose of illustration, one embodiment of a system and method for measuring pin protrusion and collar swage height of a bolt-swaged collar fastener assembly, using a single dual-function gage, will now be disclosed in detail. However, aspects of the structure and functionality of the dual-function gage disclosed herein have application in the measurement of other types of assemblies that have dimensions analogous to the pin protrusion and collar swage height of a bolt-swaged collar fastener assembly.

Figure 1:
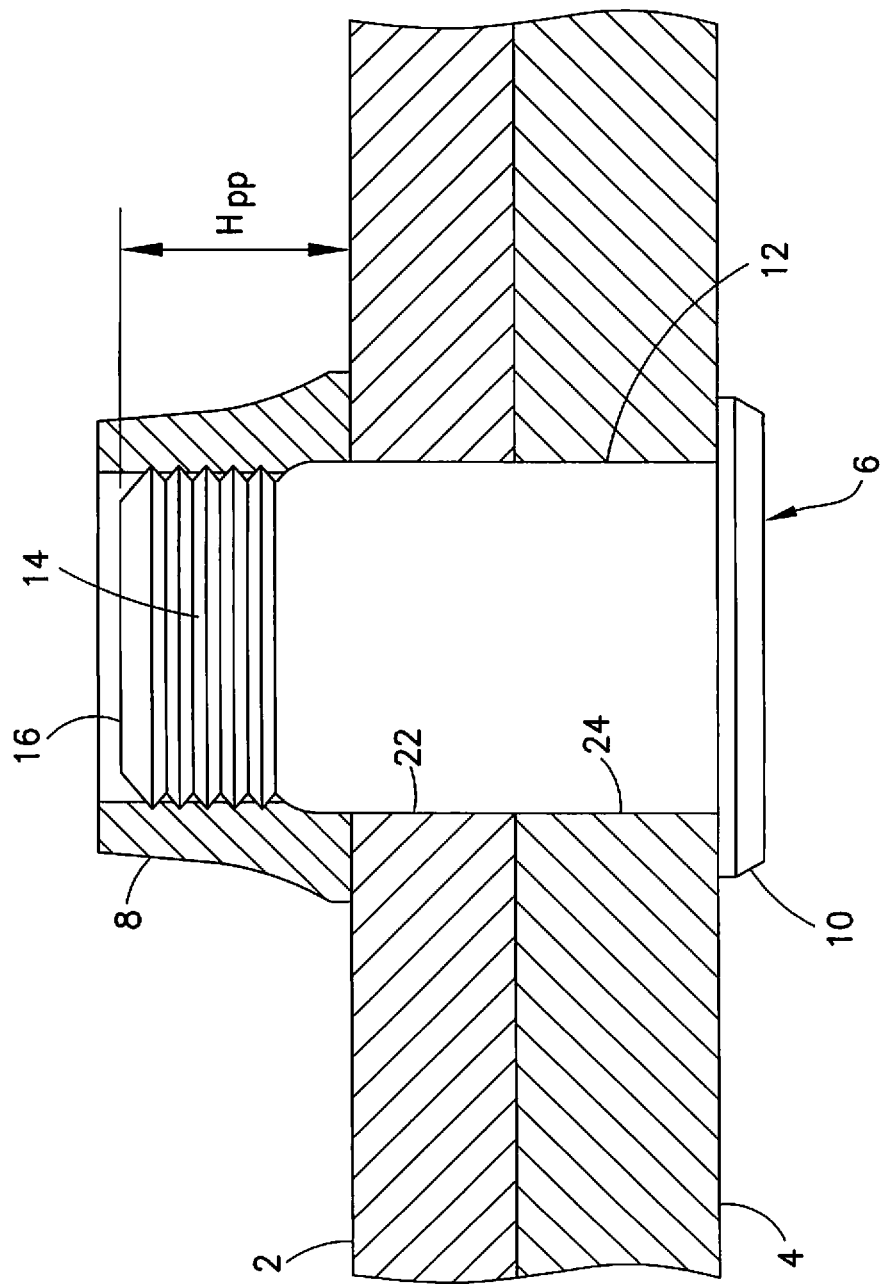
FIG. 1 is a diagram representing a sectional view of two parts fastened together by means of a fastener assembly comprising a bolt locked in place by a swaged collar. The dimensions of interest include the pin protrusion $H_{PP}$ and the collar swage height $H_{CS}$.

FIG. 1 is a sectional view of a part 2 and a part 4 fastened together by means of a fastener assembly comprising a bolt 6 locked in place by a swaged collar 8. The bolt 6 comprises a head 10, an ungrooved shaft portion 12, a grooved shaft portion 14, and an end 16. The grooved shaft portion 14 protrudes above the exterior surface of part 2, while the head 10 protrudes below the exterior surface of part 4. The ungrooved shaft portion 12, having a circular cylindrical surface, is disposed in a circular cylindrical opening formed by a hole 22 in part 2 and a hole 24 in part 4, which holes 22 and 24 are aligned. The grooved shaft portion 14 of bolt 6 is engaged by material of the swaged collar 8 which has been forced radially inwardly during a swaging operation. The swaged collar 8 prevents the bolt 6 from moving in an axially direction.

During the swaging process, an unswaged collar is positioned so that an endface of the collar abuts the exterior surface of part 2 in an annular area that surrounds hole 22 in part 2 and thus also surrounds the protruding portion of bolt 6. Then a die (not shown in FIG. 1) is pressed downward onto the unswaged collar with sufficient force to swage (i.e., deform) the collar. The mold line inside the die is shaped so that deformed material moves radially inward to interengage with the grooves of the grooved shaft portion 14 (as seen in FIG. 1), thereby fastening parts 2 and 4 together.

The dimensions to be measured by the dual-function gage disclosed hereinafter include the pin protrusion $H_{PP}$ and the collar swage height $H_{CS}$, indicated in FIG. 1. The pin protrusion $H_{PP}$ is equal to the distance from the surface of part 2 to the end 16 of the bolt 6. The collar swage height $H_{CS}$ is determined by the inside diameter of the plug and the distance from the surface of part 2 to where the inside diameter of the plug rests on the die-formed collar swage.

Figure 2:
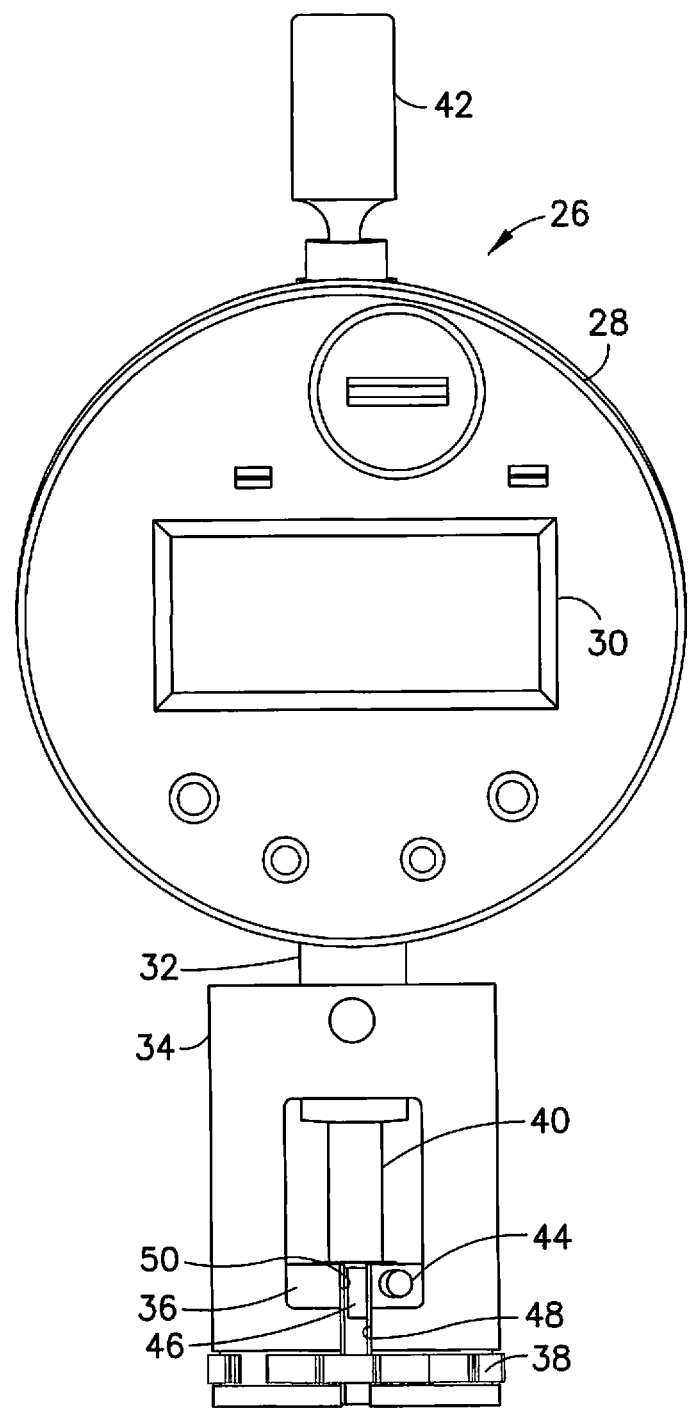
FIG. 2 is a diagram representing a front view of a dual-function gage for measuring pin protrusion and collar swage height in accordance with one embodiment.

FIG. 2 is a front view of a dual-function gage 26 designed to measure the pin protrusion and collar swage height of a bolt-swaged collar fastener assembly in accordance with one embodiment. The gage 26 comprises a digital indicator 28 of a type having a liquid crystal display (LCD) 30, an indicator shaft guide 32, an indicator shaft 40 which is translatably coupled to the indicator shaft guide 32, and a shaft pull-up knob 42 which is fixedly attached to one end of the indicator shaft 40. The gage 26 further comprises an encoder (not visible in FIG. 2) which encodes the absolute position of the indicator shaft 40 relative to the indicator shaft guide 32 as the indicator shaft 40 translates axially. The absolute position of the indicator shaft 40 is displayed on the LCD 30. Suitable digital indicators of the foregoing type are commercially available from Mitutoyo America Corporation, Aurora, Ill.

The above-described digital indicator can be adapted to perform the dual-mode measurement of the pin protrusion and collar swage height of a bolt-swaged collar fastener assembly. The adaptation comprises the attachment of a gage body 34 to the indicator shaft guide 32 and the attachment of a pin protrusion measurement contact member (not visible in FIG. 2) and a collar swage height measurement contact member 46 to the other end of the indicator shaft 40. The gage body 34 has a slot 48.

A gage plug 36, having a radially outwardly directed pin 44 and slot 50, is insertable into (and removable from) the gage body 34 when the pin 44 is aligned with and inserted into the slot 48. Upon insertion, the gage plug 36 is slidable axially and rotatable (about the same axis) inside a volume of interior space partly bounded by the gage body 34. After the gage plug 36 has been inserted into the gage body 34, the inspector/mechanic can manually rotate a retaining ring 38, which is seated in an outer circumferential groove formed in the gage body 34. The retaining ring 38 is rotatable relative to the gage body 34 between a first angular position where it blocks pin 44 from exiting slot 48 at a lower end thereof and a second angular position where it does not block pin 44 from exiting slot 48. While the gage plug 36 is retained within the gage body 34, the pin 44 can be manipulated by the inspector/mechanic for rotating and/or translating the gage plug 36 relative to the gage body 34, for reasons which will be explained below.

As will be described in detail below with reference to FIGS. 3 and 4, the pin protrusion measurement contact 52 (not visible in FIG. 2) and the collar swage height measurement contact 46 are attached to the other end of the indicator shaft 40. In the gage state depicted in FIG. 2, the collar swage height measurement contact 46 is disposed in slot 50 formed in the gage plug 36. FIG. 2 shows a situation wherein the gage plug 36 has been inserted into the gage body 34 and then rotated to a relative angular position at which slots 48 and 50 are aligned. However, slot alignment is not necessary and is shown in the drawings solely for the purpose of providing a better view of the collar swage height measurement contact member 46 inserted in slot 50 of the gage plug 36. The collar swage height measurement contact 46, which extends radially outward from the end of the indicator shaft 40, does not extend beyond the radius of the outer circumference of gage plug 36 or into slot 48 in the gage body 34. Therefore it is not necessary that the slots 48 and 50 be aligned in order for the collar swage height measurement contact 46 to travel up and down in the slot 50.

Figure 3:
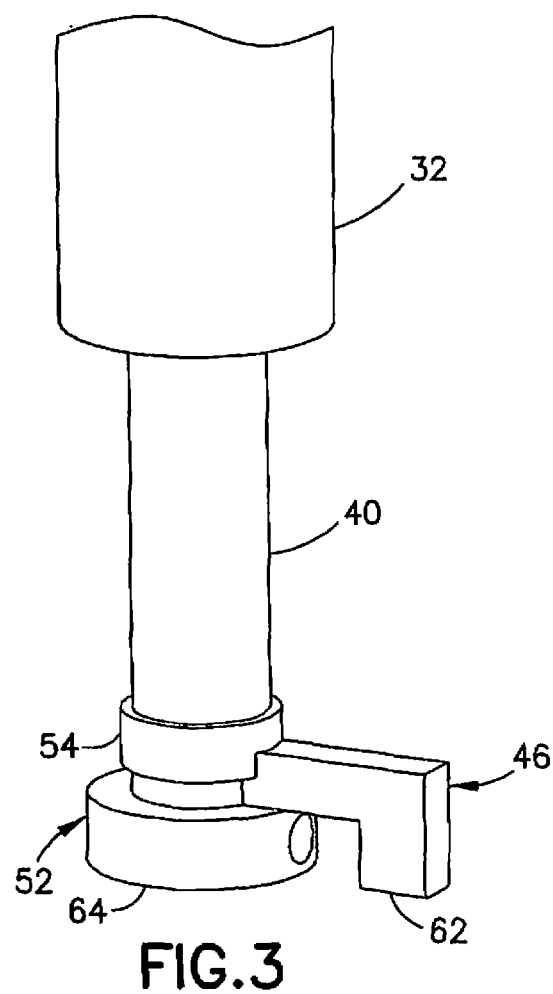
FIG. 3 is a diagram representing an isometric view of a portion of the gage depicted in FIG. 2, the depicted portion comprising an indicator shaft of a digital indicator and a contact member subassembly attached to one end of the indicator shaft.

FIG. 3 shows a portion of the gage depicted in FIG. 2. The depicted portion includes a distal portion of the indicator shaft guide 32, a portion of the indicator shaft 40, an L-shaped collar swage height measurement contact member 46 mounted to the distal end of the indicator shaft 40; and a disk-shaped pin protrusion measurement contact member 52 coupled to the indicator shaft 40 in the manner shown in FIG. 4. The angular position of the collar swage height measurement contact member 46 is dictated by a contact positioning ring 54 which is attached to the distal end of the indicator shaft 40. The bottom surface 62 of the collar swage height measurement contact member 46 and the bottom surface 64 of the pin protrusion measurement contact member 52 are coplanar.

Figure 4:
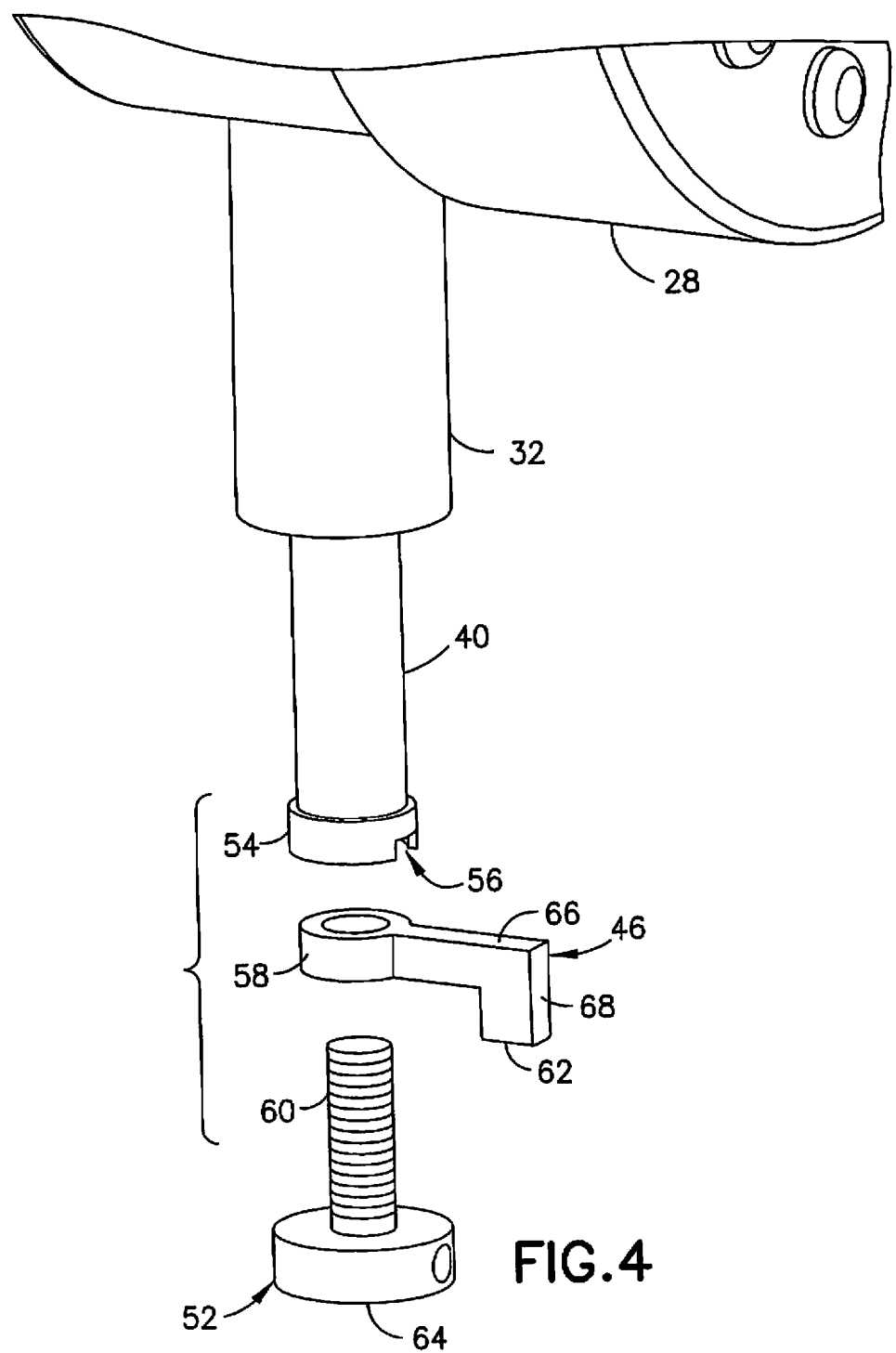
FIG. 4 is a diagram representing an exploded view showing the separate components of the portion of the gage depicted in FIG. 3.

FIG. 4 is an exploded view showing the separate components of the subassembly depicted in FIG. 3. The pin protrusion measurement contact member 52 is attached to an end of a threaded shaft 60, which is received in a threaded axial bore (not visible in FIG. 4) formed in the distal end of the indicator shaft 40. The threaded shaft 60 is passed through a circular ring 58 which is integrally formed with an arm 66 of the L-shaped collar swage height measurement contact member 46. The L-shaped collar swage height measurement contact member 46 further comprises a finger 68 which is integrally connected to arm 66. The threaded shaft 60 is screwed into the distal end of the indicator shaft, with the arm 66 being disposed in a slot 56 that is formed in the contact positioning ring. As the threaded shaft 60 is tightened, the collar swage height measurement contact member 46 is secured by the axial compressive forces exerted on the circular ring 58. The slot 56 prevents the collar swage height measurement contact member 46 from rotating about the axis of the indicator shaft 40. As previously mentioned, when components shown in FIG. 4 are assembled as shown in FIG. 3, the bottom surface 62 of the collar swage height measurement contact member 46 (i.e., the bottom surface of finger 68) and the bottom surface 64 of the pin protrusion measurement contact member 52 are coplanar.

Figure 5:
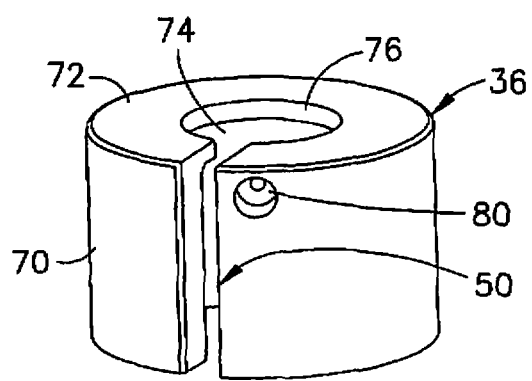
FIG. 5 is a diagram representing an isometric view of the gage plug incorporated in the gage depicted in FIG. 2.

FIG. 5 is an isometric view of the gage plug 36 incorporated in the gage 26 depicted in FIG. 2. The gage plug 36 may be made of any suitable metal, e.g., stainless steel. The gage plug 36 comprises a circular cylindrical sidewall 70 and a flange 72 integrally connected to one end of the sidewall 70. The interior surface of the sidewall 70 defines a bore that communicates with a circular opening 76 formed in the flange 72. A slot 50 is formed in the sidewall 70 and flange 72. Slot 50 extends the entire height of the gage plug 36 and the entire width of the flange 72. The slot 50, bore 74, and circular opening 76 communicate with each other. The sidewall 70 further comprises a recess 80 for receiving the pin 44 shown in FIG. 2.

As will be explained in detail below, the gage plug 36 is designed to sit on a protruding portion of the bolt-swaged collar fastener assembly shown in FIG. 1. A protruding portion of the fastener assembly is received in the bore 74 of gage plug 36. The pin protrusion measurement contact member 52 (shown in FIG. 3) has a diameter less than the diameter of the circular opening 76 (shown in FIG. 5), which allows the pin protrusion measurement contact member 52 to move through the circular opening 76 and contact the distal end 16 of bolt 6 (see FIG. 1) of the fastener assembly during pin protrusion measurement.

Figure 6:
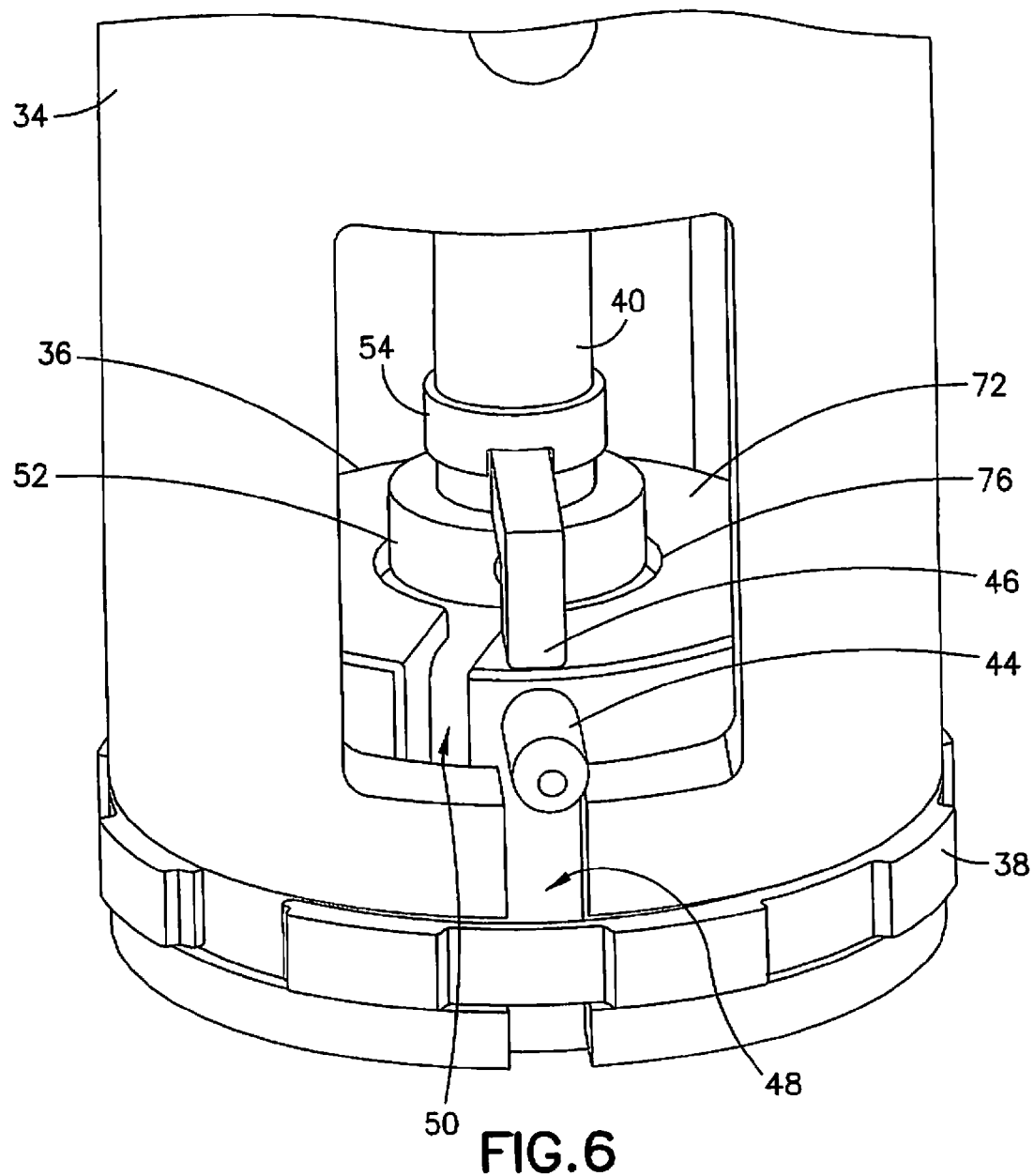
FIG. 6 is a diagram representing an isometric view of portions of the gage depicted in FIG. 2. The gage is shown in a collar swage height measurement mode.

FIG. 6 is a diagram representing an isometric view of portions of the gage depicted in FIG. 2. The gage is shown in a collar swage height measurement mode. In accordance with the configuration depicted in FIG. 6, the collar swage height measurement contact member 46 has been lifted out of the slot 50 of the gage plug 36 and then the gage plug 36 has been rotated to an angular position relative to the gage body 34 such that slot 50 of gage plug 36 is not aligned with the collar swage height measurement contact member 46. In this configuration, the collar swage height measurement contact member 46 is in contact with and seated on the flange 72 of gage plug 36. This configuration is also used during origin/zero setting.

Figure 7:
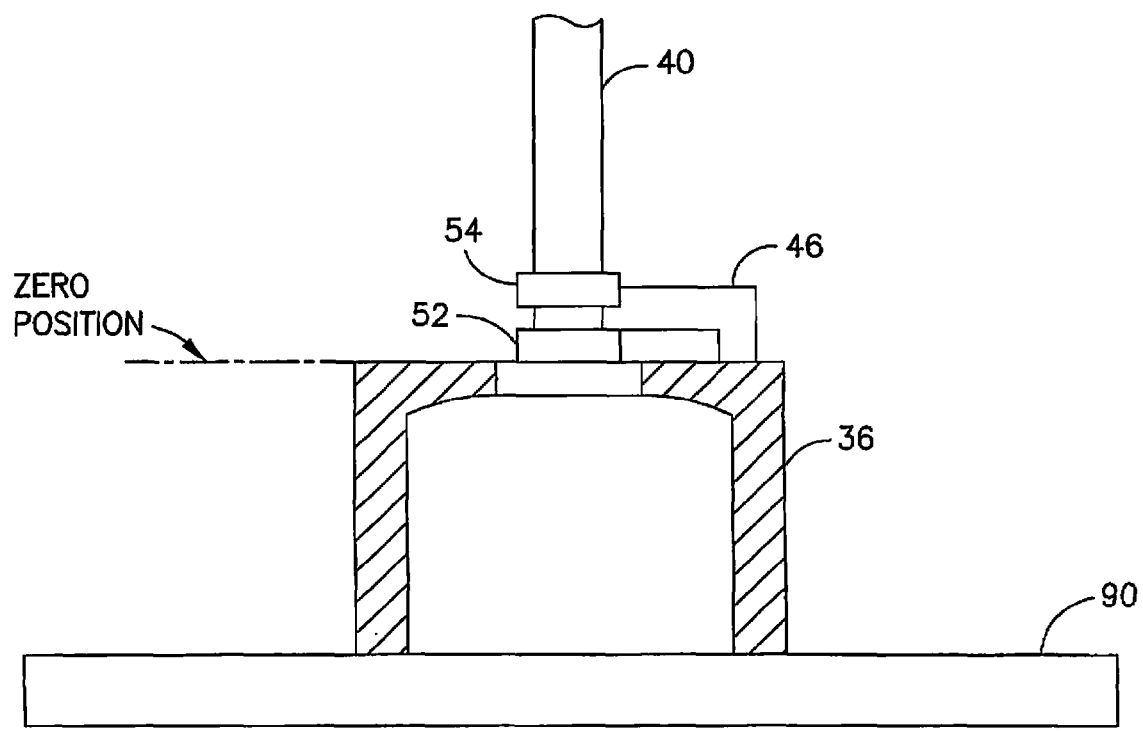
FIG. 7 is a diagram representing a partially sectioned elevational view showing the position of the indicator shaft of the digital indicator relative to a flat surface during origin or zero setting. The gage is in the collar swage height measurement mode (shown in FIG. 6) during origin setting.

FIG. 7 shows the position of the indicator shaft 40 relative to a flat surface 90 during origin/zero setting (i.e., during zeroing of the shaft position). First, the gage plug 36 is seated on a flat surface 90. Although not shown in FIG. 7, the gage body 34 (see FIG. 6), surrounding the gage plug 36, is also seated on the flat surface 90. In other words, the bottom end faces of the gage body 34 and the gage plug 36 are coplanar and in contact with the flat surface 90. When the contact surface of the collar swage height measurement contact member 46 is in contact with and seated on flange 72 of gage plug 36, the contact surface of the pin protrusion measurement contact member 52 (which is coplanar with the contact surface of the collar swage height measurement contact member 46) will be located at a height above the flat surface 90 which is slightly greater than the height of the gage plug 36. This height is also equal to the distance separating the contact surface of the pin protrusion measurement contact member 52 from the bottom end face of the gage body (not shown in FIG. 7). The axial position of the indicator shaft 40 seen in FIG. 7 is set equal to zero. If the indicator shaft 40 later moves upward relative to the gage body (which is affixed to the digital indicator) from the axial position shown in FIG. 7, the digital indicator will display a positive number. Conversely, if the indicator shaft 40 moves downward relative to the gage body from the axial position shown in FIG. 7, the digital indicator will display a negative number.

Figure 8:
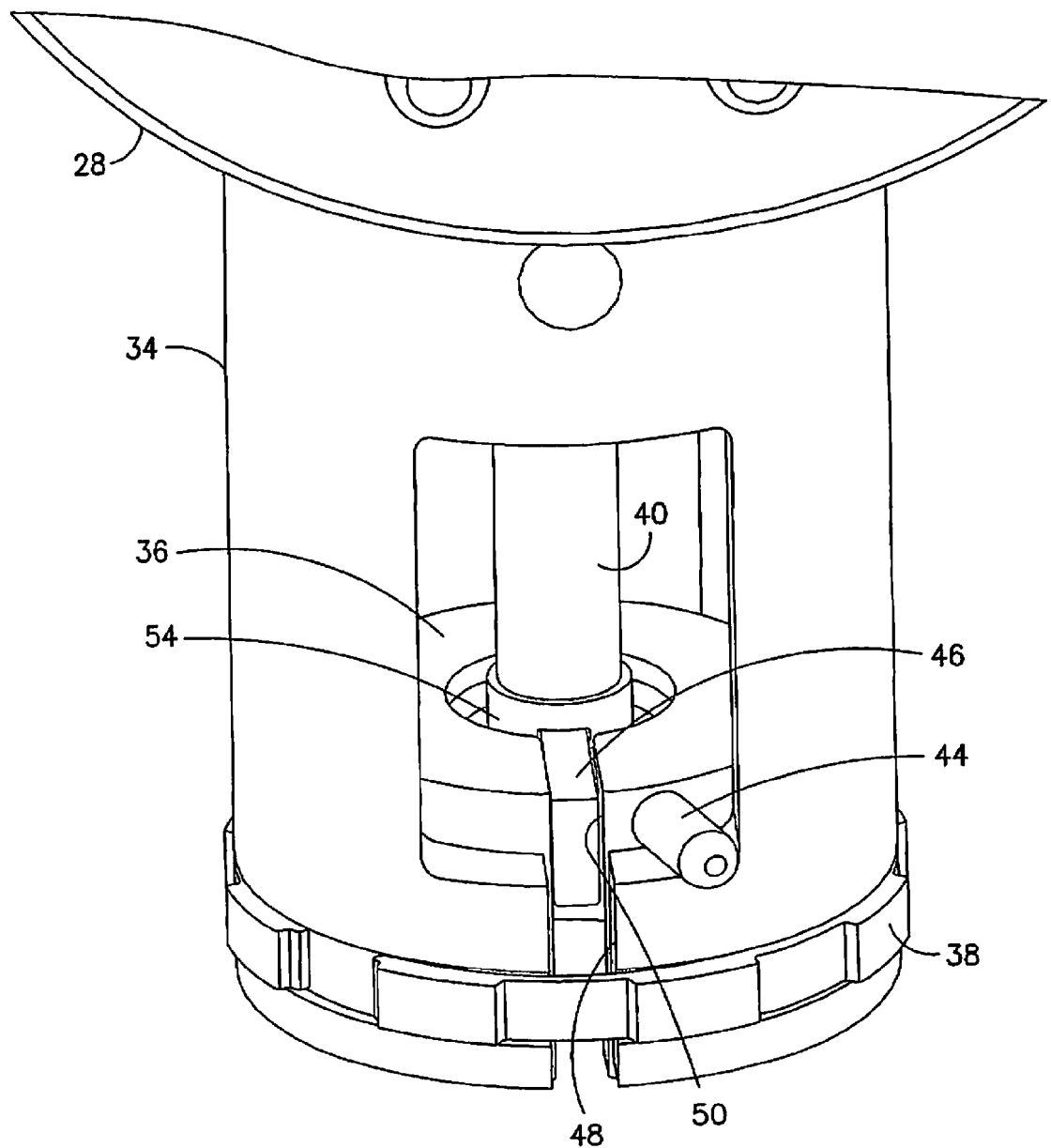
FIG. 8 is a diagram representing an isometric view of portions of the gage depicted in FIG. 2. The gage is shown in a pin protrusion measurement mode.

FIG. 8 is an isometric view of portions of the gage depicted in FIG. 2. The gage is shown in a pin protrusion measurement mode. To arrive at the configuration shown in FIG. 8, the gage plug 36 is rotated relative to the gage body 34 until the collar swage height measurement contact member 46 is aligned with slot 50 formed in gage plug 36. Then the indicator shaft 40 is lowered so that the collar swage height measurement contact member 46 is inserted into slot 50 while the pin protrusion measurement contact member (not visible in FIG. 8) is passed through the circular opening 76 in gage plug 36, allowing the contact surface of the pin protrusion measurement contact member to contact the end of the bolt of the bolt-swaged collar fastener assembly, as seen in FIG. 9.

Figure 9:
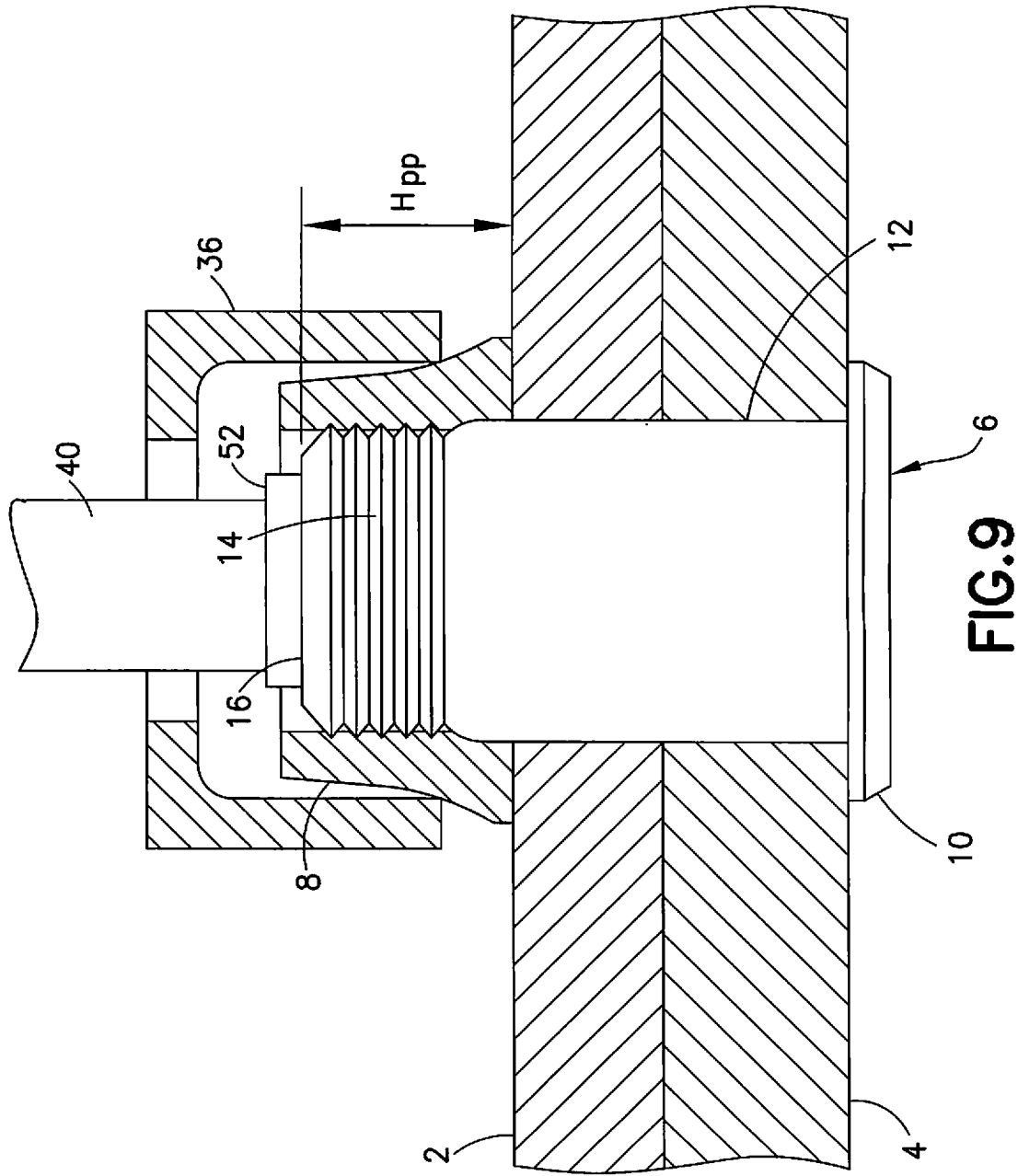
FIG. 9 is a diagram representing a sectional view showing a gage plug and a pin protrusion measurement contact member of the dual-function gage depicted in FIG. 2 during measurement of the pin protrusion $H_{PP}$ in the fastener assembly depicted in FIG. 1

FIG. 9 is a sectional view showing a gage plug 36 and a pin protrusion measurement contact member 52 of the dual-function gage 26 depicted in FIG. 2 during measurement of pin protrusion $H_{PP}$ in a fastener assembly comprising a bolt 6 and a swaged collar 8. (The collar swage height measurement contact member is not shown in FIG. 9 because it is not involved in the pin protrusion measurement, except to the extent that it must be aligned with the slot in the gage plug 36 to allow the pin protrusion measurement contact member 52 to pass through the circular opening 76 in gage plug 36.) The gage plug 36 is seated on the swaged collar 8 at an elevation where the inner surface of the lower lip of the gage plug 36 matches the exterior surface of the swaged collar. In the situation depicted in FIG. 9, the reading on the LCD of the digital indicator will display a number representing the displacement of the indicator shaft 40 from its zero position. The pin protrusion measurement value $H_{PP}$ will be equal to the gage plug height plus the indicator reading (which number may be negative).

Changing from the pin protrusion measurement mode to the collar swage height measurement mode involves three simple steps. First, the inspector/mechanic pulls the indicator knob 42 (shown in FIG. 2) up so that the collar swage height measurement contact member 46 exits the slot 50 in the gage plug 36. Second, the inspector/mechanic pushes the pin 44 to rotate the gage plug 36 by about 10° clockwise as shown in FIG. 8. Third, the inspector/mechanic releases the indicator knob 42 and lets the collar swage height measurement contact member 46 rest on top of the gage plug as shown in FIG. 8.

Figure 10:
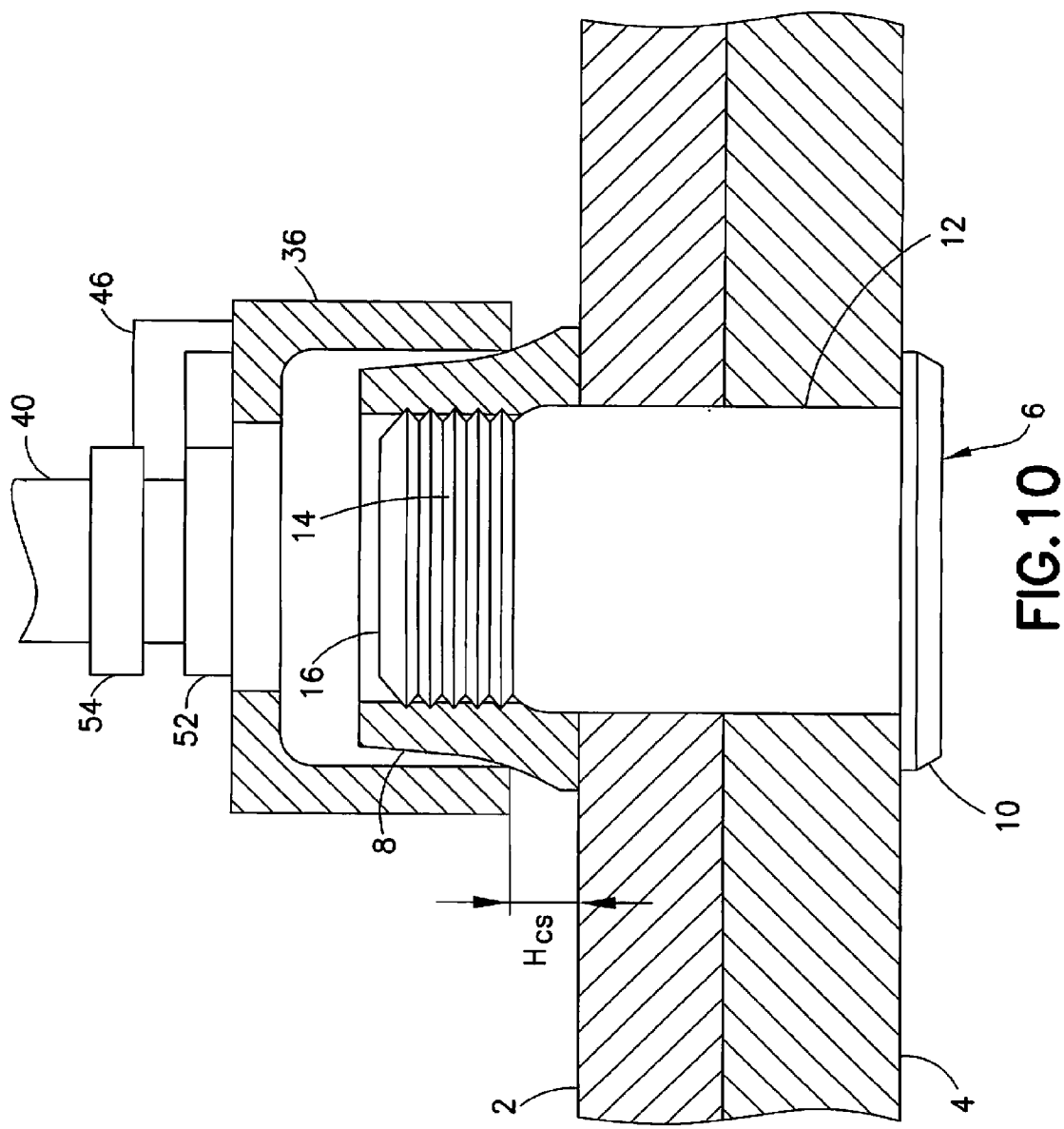
FIG. 10 is a diagram representing a sectional view showing a gage plug and a collar swage height measurement contact member of the dual-function gage depicted in FIG. 2 during measurement of the collar swage height $H_{CS}$ in the fastener assembly depicted in FIG. 1

FIG. 10 is a sectional view showing a gage plug 36 and a collar swage height measurement contact member 46 of the dual-function gage 26 depicted in FIG. 2 during measurement of the collar swage height $H_{CS}$ in the same fastener assembly depicted in FIG. 9. As previously disclosed with reference to FIG. 6, in the collar swage height measurement mode, the collar swage height measurement contact member 46 is seated on the top surface of the gage plug 36. The gage plug 36 is seated on the swaged collar 8 at the same elevation as seen in FIG. 9. In the situation depicted in FIG. 10, the reading on the LCD of the digital indicator will again display a number representing the displacement of the indicator shaft 40 from its zero position. The collar swage height measurement value $H_{CS}$ will be equal to the indicator reading.

Figure 11:
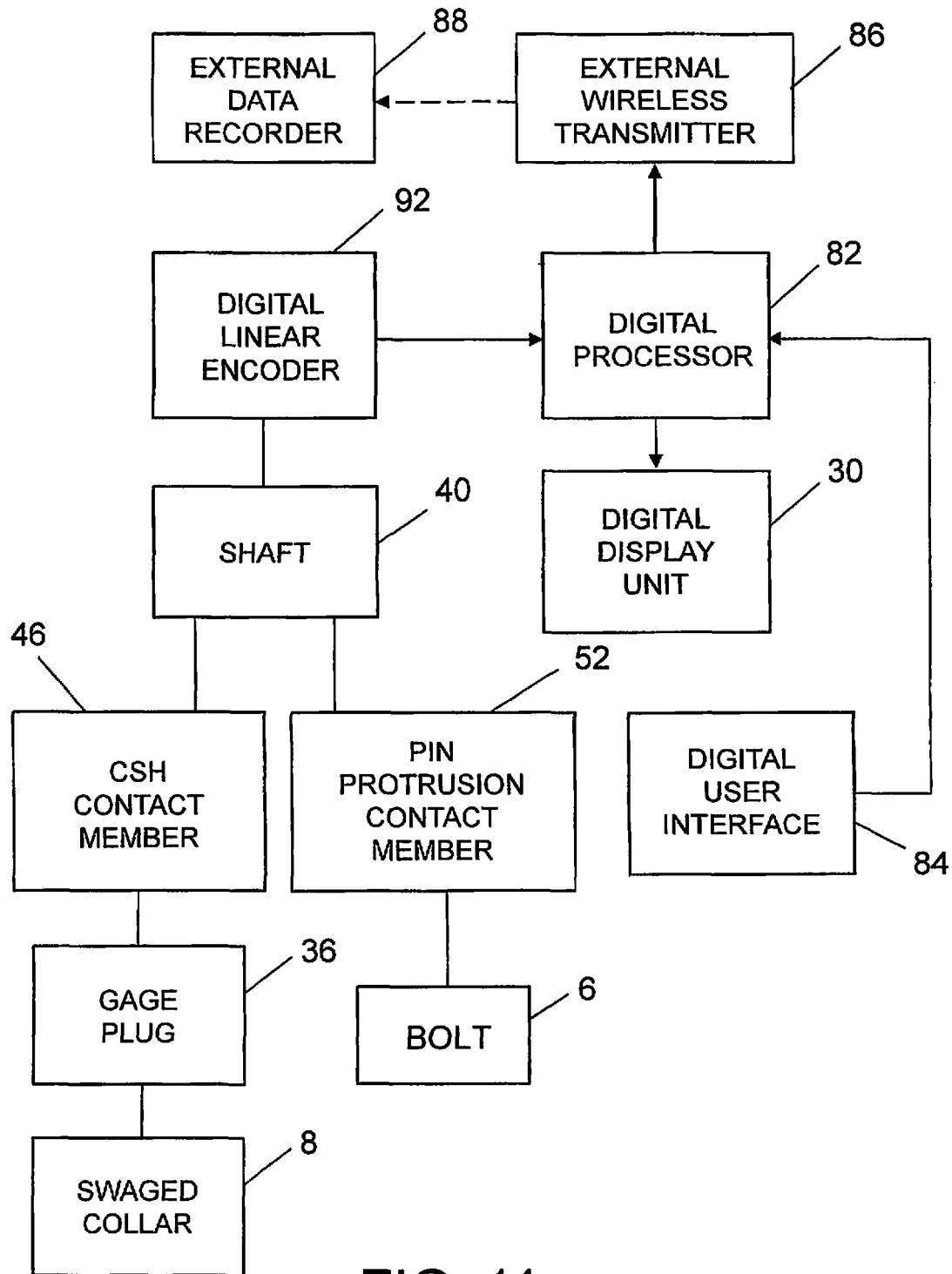
FIG. 11 is a block diagram showing various components of a system for measuring pin protrusion and collar swage height using a dual-function gage in accordance with one embodiment.

FIG. 11 is a block diagram showing various components of a system comprising a fastener assembly and an apparatus for measuring two dimensions of the fastener assembly. The fastener assembly comprises a bolt 6 and a swaged collar 8. The measuring apparatus comprises a gage plug 36 that sits on the swaged collar 8 while measurements are made. The measuring apparatus further comprises an indicator shaft 40 having a collar swage height (CSH) measurement contact member 46 and a pin protrusion measurement contact member 52 affixed to a distal end of the indicator shaft 40. In the collar swage height measurement mode, the collar swage height measurement contact member 46 sits atop the gage plug 36, which is sitting on the swaged collar 8. In the pin protrusion measurement mode, the pin protrusion measurement contact member 52 sits atop the bolt 6. The absolute axial position of the indicator shaft 40 is determined using a linear encoder 92, which outputs incremental displacement signals in response to incremental axial displacement of the indicator shaft 40 relative to the gage body (not shown in FIG. 11). The measuring apparatus further comprises a processor 82 for converting the incremental displacement signals from the linear encoder 80 into signals representing total displacement of the indicator shaft 40 and a display unit 30 which displays symbology representing the total displacement in response to receipt from the processor 82 of signals representing total displacement of the indicator shaft 40. The measuring apparatus further comprises a user interface 84. The user interface 84 includes a SET button which is pressed by the inspector/mechanic when he wishes to zero the measuring apparatus.

In accordance with one test protocol, pin protrusion is measured first and then the collar swage height is measured. The pin protrusion measurement value calls up a range of collar swage heights, within which the collar swage height measurement value is supposed to fall in order for the fastener assembly to pass inspection. The measurement values are sent from the processor 82 to a data recorder 88 by a wireless transmitter 86. The data recorder 88 is used to automatically record the pin protrusion measurement value, determine the appropriate range for the collar swage height, and then check whether the collar swage height measurement value falls within the specified range or not. The data recorder 88 automatically adjusts the pin protrusion measurement value by taking into account the height of the gage plug, as previously described. The data recorder 88 can trigger an alert notifying the inspector/mechanic that the collar swage height measurement value is outside the applicable range associated with the pin protrusion measurement value.

Figure 12:
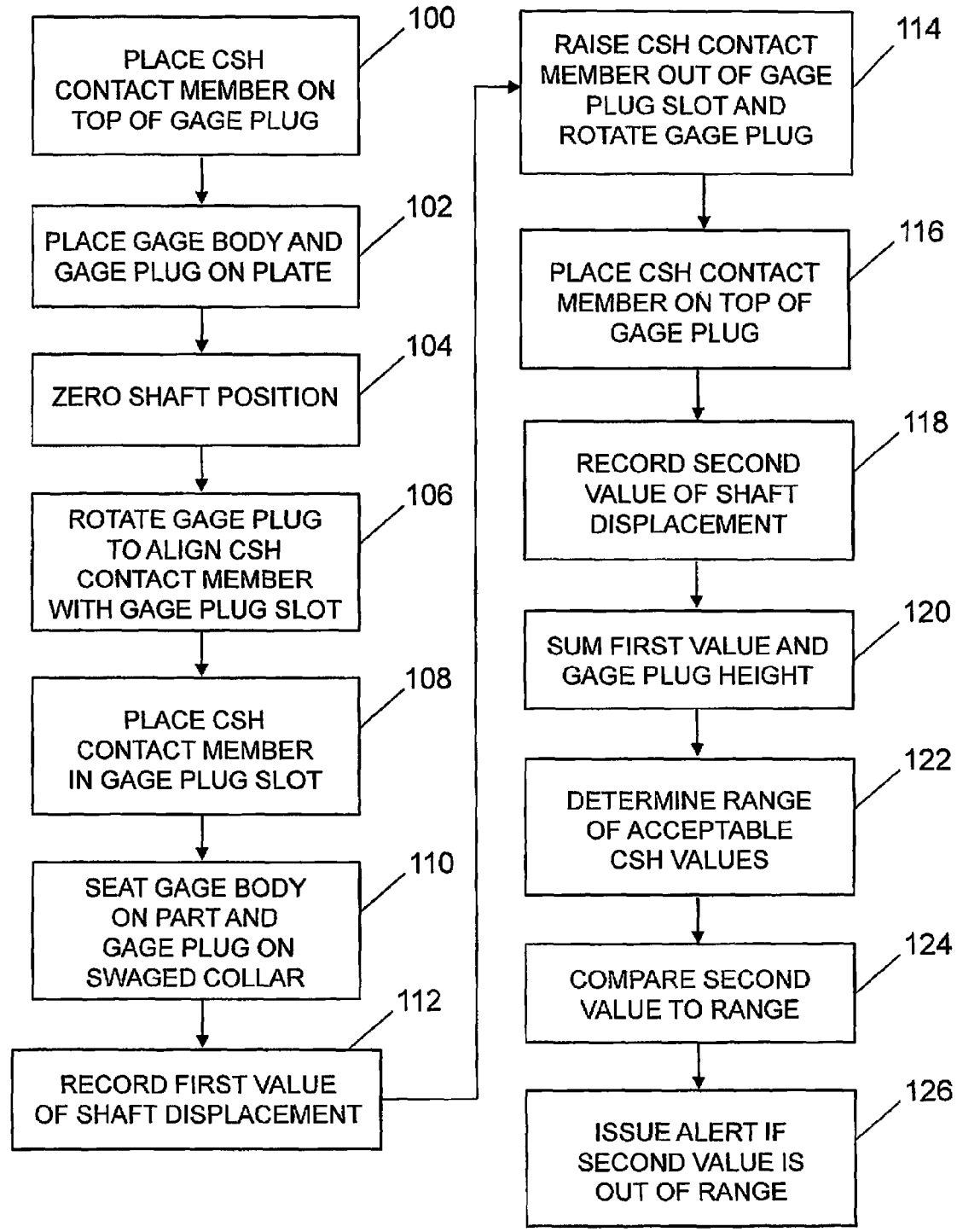
FIG. 12 is a flowchart showing steps of a process for measuring pin protrusion and collar swage height using a dual-function gage in accordance with one embodiment.

FIG. 12 is a flowchart showing steps of a process for measuring pin protrusion and collar swage height (CSH) using a dual-function gage in accordance with one embodiment. The measuring method comprising the following steps: (a) placing a collar swage height measurement contact member carried by an axially displaceable shaft in contact with a top surface of a slotted gage plug disposed in a first angular position relative to a gage body of a gage (step 100); (b) placing bottom surfaces of the gage body and the slotted gage plug on a planar surface of a plate while the collar swage height measurement contact member is in contact with the top surface of the slotted gage plug (step 102); (c) zeroing the position of the shaft (step 104) while the collar swage height measurement contact member, the gage body and the slotted gage plug are in the positions adopted in step 102; (d) rotating the slotted gage plug from the first angular position to a second angular position whereat the slot of the slotted gage plug is aligned with the collar swage height measurement contact member (step 106); (e) placing the collar swage height measurement contact member into the slot of the slotted gage plug (step 108); (f) while the collar swage height measurement contact member is in the slot of the slotted gage plug, placing the gage body over the fastener assembly in a position such that the bottom surface of the gage body is seated on the first part, the bottom surface of the slotted gage plug is seated on the swaged collar and a pin protrusion measurement contact member carried by the shaft is in contact with the bolt (step 110); (g) while the slotted gage plug is fully seated on the swaged collar and the pin protrusion measurement contact member is in contact with the bolt, recording a first value representing a first total axial displacement of the shaft relative to its zeroed position (step 112); (h) moving the collar swage height measurement contact member out of the slot of the slotted gage plug (step 114); (i) while the collar swage height measurement contact member is out of the slot of the slotted gage plug, rotating the slotted gage plug to a third angular position whereat the slot of the slotted gage plug is not aligned with the collar swage height measurement contact member and the collar swage height measurement contact member is in contact with the top surface of the slotted gage plug (step 116); and (j) while the slotted gage plug is fully seated on the swaged collar and the collar swage height measurement contact member is in contact with the top surface of the slotted gage plug, recording a second value representing a second total axial displacement of the shaft relative to its zeroed position (step 118). Preferably steps 114, 116 and 118 are performed while the bottom surface of the gage body is in contact with the first part, but maintaining contact is not necessary. The measuring method shown in FIG. 12 further comprises the following steps performed by a data processor: calculating a pin protrusion value by summing the first value and a value representing of a height of the slotted gage plug (step 120); determining a range of acceptable collar swage height values corresponding to the pin protrusion value (step 122); comparing the second value to the range of acceptable collar swage height values (step 124); and issuing an alert if the second value lies outside the range of acceptable collar swage height values (step 126).

Each of the first and second measurement values can be recorded by pressing a button on the data recorder 88 shown in FIG. 11. The inspector/mechanic can then proceed to measure the next installed fastener assembly by repeating the above-described procedure until all required fastener assemblies have been measured.

Figure 13:
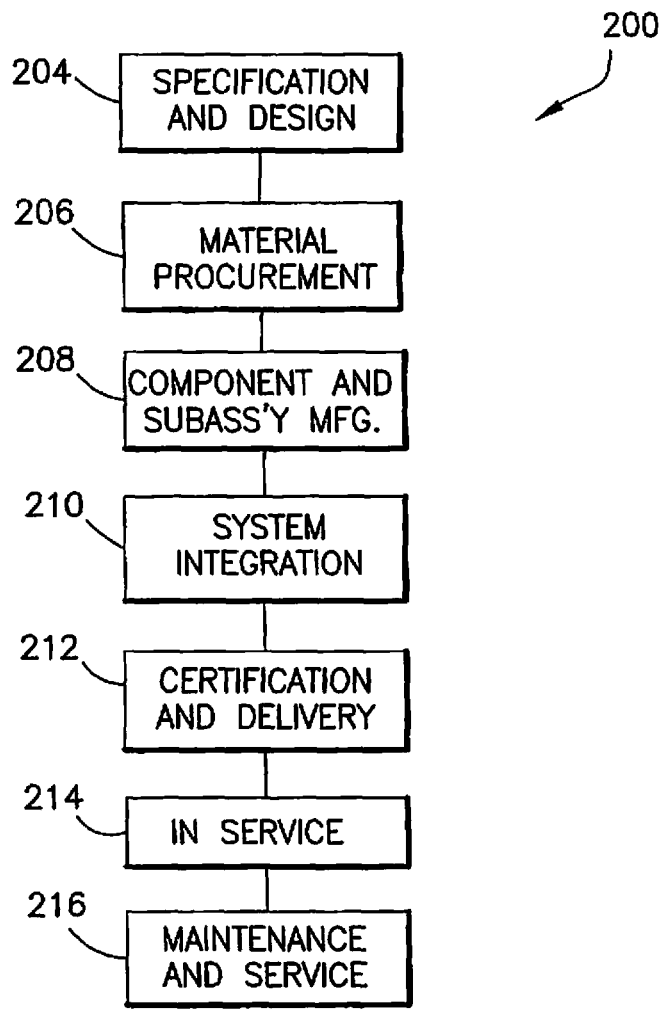
FIG. 13 is a flow diagram of an aircraft production and service methodology.
Figure 14:
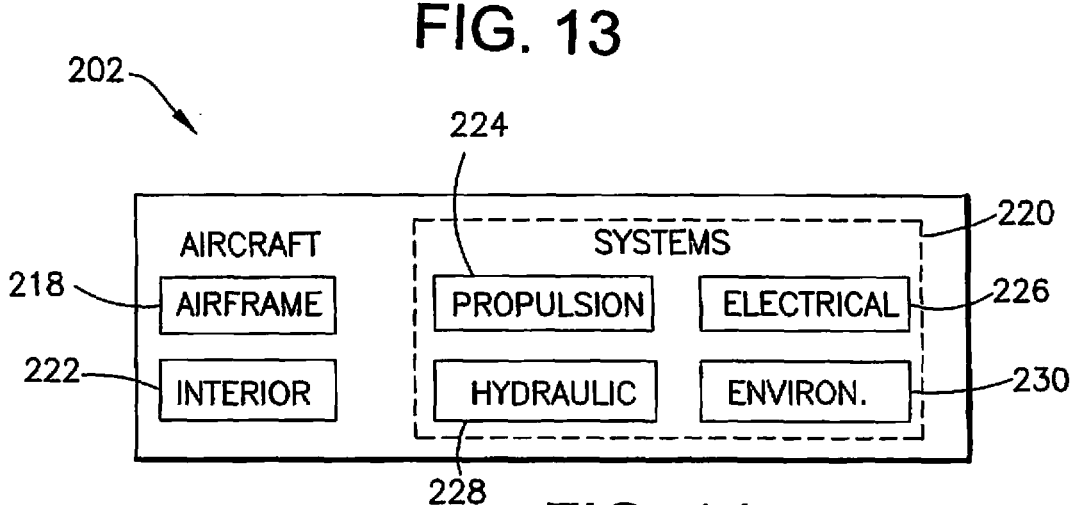
FIG. 14 is a block diagram showing systems of an aircraft.

The measuring apparatus and methodology disclosed above may be employed in an aircraft manufacturing and service method 100 as shown in FIG. 13 for assembling an aircraft 202 as shown in FIG. 14. During pre-production, exemplary method 200 may include specification and design 204 of the aircraft 202 and material procurement 206. During production, component and subassembly manufacturing 208 and system integration 210 of the aircraft 202 takes place. System integration 210 includes, but is not limited to, the fastener assembly measurement operations disclosed herein. Thereafter, the aircraft 222 may go through certification and delivery 212 in order to be placed in service 214. While in service by a customer, the aircraft 202 is scheduled for routine maintenance and service 216 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 14, the aircraft 202 produced by exemplary method 200 may include an airframe 218 (including components fastened together using bolt and swaged collar fastener assemblies) with a plurality of systems 220 and an interior 222. Examples of high-level systems 220 include one or more of the following: a propulsion system 224, an electrical system 226, a hydraulic system 228, and an environmental control system 230. Any number of other systems may be included. Bolt and swaged collar fastener assemblies can be measured using the dual-function gage disclosed hereinabove.

One or more apparatus embodiments, method embodiments, or a combination thereof may be utilized during the system integration stage 210 by substantially expediting the assembly of or reducing the cost of an aircraft 202.

While gages have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The method claims set forth hereinafter should not be construed to require that all of the steps recited therein be performed in alphabetical order or in the order in which they are recited.

The invention claimed is:

1. An apparatus comprising:
   a gage body;
   a shaft which is axially displaceable relative to said gage body;
   a digital indicator coupled to said gage body and configured to measure axial displacement of said shaft relative to said gage body;
   a first contact member coupled to said shaft, said first contact member having a first contact surface;
   a second contact member coupled to said shaft, said second contact member having a second contact surface offset from said first contact surface; and
   a gage plug insertable into an interior space bounded at least in part by said gage body and having a slot, said gage plug being rotatable and axially displaceable relative to said gage body and said slot being parallel to said shaft when said gage plug is inserted into said interior space,
   wherein when said gage plug is in a first angular position relative to said gage body, said second contact member is aligned with said slot, and when said gage plug is in a second angular position different than said first angular position, said second contact member is not aligned with said slot.

2. The apparatus as recited in claim 1, wherein said gage body comprises a slot, and said gage plug comprises a pin that fits in said slot of said gage body.

3. The apparatus as recited in claim 2, further comprising a retainer device disposed outside said gage body and rotatable relative thereto, wherein said retainer device blocks said pin from exiting said slot at a lower end thereof when said retainer device is in a first angular position relative to said gage body and does not block said pin from exiting said slot at said lower end thereof when said retainer device is in a second angular position relative to said gage body.

4. The apparatus as recited in claim 1, wherein said first and second contact surfaces are coplanar.

5. The apparatus as recited in claim 1, wherein said first contact member comprises a disk, and said second contact member comprises a ring portion surrounding a portion of said shaft, an arm portion extending radially from said ring portion, and a finger portion extending downward from a distal end of said arm portion, said second contact surface being a surface at a distal end of said finger portion.

6. The apparatus as recited in claim 1, wherein said digital indicator comprises an encoder for outputting incremental displacement signals in response to incremental displacement of said shaft relative to said gage body, and a processor for converting incremental displacement signals into signals representing total displacement of said shaft.

7. The apparatus as recited in claim 6, further comprising a display unit which displays symbology representing said total displacement in response to receipt from said processor of signals representing total displacement of said shaft.

8. A system comprising first and second parts fastened together by at least one fastener assembly comprising a bolt and a swaged collar, and a measuring apparatus comprising:
   a gage body seated on a portion of said first part located radially outward of said collar;
   a shaft disposed above said bolt and axially displaceable relative to said gage body;
   a first contact member coupled to said shaft and having a first contact surface;
   a second contact member coupled to said shaft and having a second contact surface offset from said first contact surface; and
   a gage plug seated on said collar, said gage plug being rotatable and axially displaceable relative to said gage body and having a center hole,
   wherein said shaft is in a first axial position and said first contact surface contacts said bolt when said measuring apparatus is in a pin protrusion measurement mode, and said shaft is in a second axial position and said second contact surface contacts said gage plug when said measuring apparatus is in a collar swage height measurement mode.

9. The system as recited in claim 8, wherein said first and second contact surfaces are coplanar.

10. The system as recited in claim 8, wherein said measuring apparatus further comprises a digital indicator coupled to said gage body and configured to measure axial displacement of said shaft relative to said gage body.

11. The system as recited in claim 10, wherein said digital indicator comprises an encoder for outputting incremental displacement signals in response to incremental displacement of said shaft relative to said gage body, and a processor for converting incremental displacement signals into signals representing total displacement of said shaft.

12. The system as recited in claim 11, further comprising a display unit which displays symbology representing said total displacement in response to receipt from said processor of signals representing total displacement of said shaft.

13. The system as recited in claim 8, wherein said gage plug comprises a slot disposed parallel to said shaft, said slot being aligned with said second contact member when said measuring apparatus is in said pin protrusion measurement mode, and said slot being not aligned with said second contact member when said measuring apparatus is in said collar swage height measurement mode.

14. The system as recited in claim 8, wherein said first contact member comprises a disk, and said second contact member comprises a ring portion surrounding a portion of said shaft, an arm portion extending radially from said ring portion, and a finger portion extending downward from a distal end of said arm portion, said second contact surface being a surface at a distal end of said finger portion.

15. A kit comprising:
a gage body that at least partly bounds an interior space;
a shaft which is axially displaceable relative to said gage body;
a digital indicator coupled to said gage body and configured to measure axial displacement of said shaft relative to said gage body;
a first gage plug having a first height and a first slot, said first gage plug being insertable into said interior space, wherein when said first gage plug is inserted into said interior space, said gage plug is rotatable and axially displaceable relative to said gage body and said first slot is parallel to said shaft;
a first contact member having a first contact surface, said first contact member being configured for attachment to said shaft; and
a second contact member having a second contact surface, said second contact member being configured for attachment to said shaft;
wherein when said first and second contact members are attached to said shaft and said first gage plug is inserted in said interior space, said first slot is aligned with said second contact member when said gage plug is in a first angular position relative to said gage body, and said first slot is not aligned with said second contact member when said first gage plug is in a second angular position relative to said gage body.

16. The kit as recited in claim 15, further comprising a second gage plug having a second height and a second slot, said second gage plug being insertable into said interior space instead of said first gage plug, wherein when said second gage plug is inserted into said interior space, said second gage plug is rotatable and axially displaceable relative to said gage body and said second slot is parallel to said shaft.

17. The kit as recited in claim 15, wherein said gage body comprises a slot, and said first gage plug comprises a pin that fits in said slot of said gage body, further comprising a retainer device which can be rotatably coupled to said gage body, wherein said retainer device blocks said pin from exiting said slot of said gage body at a lower end thereof when said retainer device is rotatably coupled to said gage body and in a first angular position relative to said gage body, and does not block said pin from exiting said slot of said gage body at said lower end thereof when said retainer device is in a second angular position relative to said gage body.

18. A method of measuring pin protrusion and collar swage height in an assembly comprising first and second parts having aligned holes, a bolt that passes through said aligned holes and protrudes above a surface of said first part, and a swaged collar disposed on said protruding portion of said bolt, said measuring method comprising the following steps:
(a) placing a collar swage height measurement contact member carried by an axially displaceable shaft in contact with a top surface of a slotted gage plug disposed in a first angular position relative to a gage body of a gage;
(b) placing bottom surfaces of the gage body and the slotted gage plug on a planar surface of a plate while the collar swage height measurement contact member is in contact with the top surface of the slotted gage plug;
(c) zeroing the position of the shaft while the collar swage height measurement contact member, the gage body and the slotted gage plug are in the positions recited in step (b);
(d) rotating the slotted gage plug from the first angular position to a second angular position whereat the slot of the slotted gage plug is aligned with the collar swage height measurement contact member;
(e) placing the collar swage height measurement contact member into the slot of the slotted gage plug;
(f) while the collar swage height measurement contact member is in the slot of the slotted gage plug, placing the gage body over the fastener assembly in a position such that the bottom surface of the gage body is seated on the first part, the bottom surface of the slotted gage plug is seated on the swaged collar and a pin protrusion measurement contact member carried by the shaft is in contact with the bolt;
(g) while the slotted gage plug is fully seated on the swaged collar and the pin protrusion measurement contact member is in contact with the bolt, recording a first value representing a first total axial displacement of the shaft relative to its zeroed position;
(h) moving the collar swage height measurement contact member out of the slot of the slotted gage plug;
(i) while the collar swage height measurement contact member is out of the slot of the slotted gage plug, rotating the slotted gage plug to a third angular position whereat the slot of the slotted gage plug is not aligned with the collar swage height measurement contact member and the collar swage height measurement contact member is in contact with the top surface of the slotted gage plug; and
(j) while the slotted gage plug is fully seated on the swaged collar and the collar swage height measurement contact member is in contact with the top surface of the slotted gage plug, recording a second value representing a second total axial displacement of the shaft relative to its zeroed position.

19. The method as recited in claim 18, wherein steps (h) through (j) are performed while the bottom surface of the gage body is in contact with the first part.

20. The method as recited in claim 18, further comprising the following steps performed by a data processor:
calculating a pin protrusion value by summing said first value and a value representing of a height of said slotted gage plug;
determining a range of acceptable collar swage height values corresponding to said pin protrusion value;

comparing said second value to said range of acceptable collar swage height values; and issuing an alert if said second value lies outside said range of acceptable collar swage height values.

* * * * *